(12) United States Patent
Duke et al.

(10) Patent No.: US 11,286,806 B2
(45) Date of Patent: Mar. 29, 2022

(54) AUTOMATED PROPELLER FEATHER TESTING

(71) Applicant: PRATT & WHITNEY CANADA CORP., Longueuil (CA)

(72) Inventors: Brant Duke, Lasalle (CA); Kenneth Matheson, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 134 days.

(21) Appl. No.: 16/655,424

(22) Filed: Oct. 17, 2019

(65) Prior Publication Data

US 2020/0049027 A1 Feb. 13, 2020

Related U.S. Application Data

(63) Continuation of application No. 14/712,985, filed on May 15, 2015, now Pat. No. 10,487,682.

(51) Int. Cl.
| | |
|---|---|
| *F01D 21/00* | (2006.01) |
| *B64C 11/38* | (2006.01) |
| *B64C 11/06* | (2006.01) |
| *B64C 11/30* | (2006.01) |
| *F01D 7/00* | (2006.01) |
| *B64F 5/60* | (2017.01) |
| *B64C 11/32* | (2006.01) |

(52) U.S. Cl.
CPC ............ *F01D 21/003* (2013.01); *B64C 11/06* (2013.01); *B64C 11/30* (2013.01); *B64C 11/325* (2013.01); *B64C 11/385* (2013.01); *B64F 5/60* (2017.01); *F01D 7/00* (2013.01)

(58) Field of Classification Search
CPC ......... F01D 21/003; F01D 21/70; B64C 5/60; B64C 11/06; B64C 11/30; B64C 11/325; B64C 11/385
See application file for complete search history.

(56) References Cited

U.S. PATENT DOCUMENTS

| | | |
|---|---|---|
| 2,374,276 A | 4/1945 | French |
| 2,455,378 A | 12/1948 | McCoy |
| 2,601,901 A | 7/1952 | Muma |
| 2,605,849 A | 8/1952 | Bordelon |
| 2,798,563 A | 7/1957 | Miller et al. |
| 2,801,701 A | 8/1957 | Coar |
| 2,860,714 A | 11/1958 | De Muth |
| 2,924,281 A | 2/1960 | Mergen et al. |
| 3,603,697 A | 9/1971 | Lane |
| 3,973,873 A | 8/1976 | Shank |

(Continued)

*Primary Examiner* — Aaron R Eastman
(74) *Attorney, Agent, or Firm* — Norton Rose Fulbright Canada LLP (57) ABSTRACT

There is described herein methods and systems for testing a propeller feathering function. The method comprises monitoring a rotational speed over time of propeller blades of an aircraft, commanding an angle change of the propeller blades, comparing a post-angle change rotational speed of the propeller blades to an expected rotational speed without the commanded angle change and obtaining, by the processor, a rotational speed difference, and issuing a test passed signal when the rotational speed difference exceeds a threshold and a test failed signal when the rotational speed difference does not exceed the threshold.

24 Claims, 6 Drawing Sheets

(56) References Cited

U.S. PATENT DOCUMENTS

| | | | | |
|---|---|---|---|---|
| 4,904,157 A | * | 2/1990 | Pace | B64C 11/40 416/46 |
| 4,969,367 A | * | 11/1990 | Huber | B64F 5/60 73/865.9 |
| 5,019,006 A | * | 5/1991 | Schneider | B64C 11/40 416/35 |
| 5,061,153 A | * | 10/1991 | Pace | B64C 11/40 416/46 |
| 5,213,471 A | | 5/1993 | Miller et al. | |
| 5,897,293 A | | 4/1999 | Arel et al. | |
| 6,059,528 A | | 5/2000 | Danielson et al. | |
| 2015/0139798 A1 | * | 5/2015 | Duke | B64C 11/301 416/1 |

\* cited by examiner

AUTOMATED PROPELLER FEATHER TESTING

CROSS-REFERENCE TO RELATED APPLICATIONS

The present application is a continuation of U.S. patent application Ser. No. 14/712,985 filed on May 15, 2015, the contents of which are hereby incorporated by reference.

TECHNICAL FIELD

The present invention relates to the field of propeller feathering and more particularly, to dormancy tests for propeller feathering.

BACKGROUND OF THE ART

A feathered propeller has its blades moved to an extremely high pitch angle of approximately 90° so that they face perpendicular to the airstream and produce minimal aerodynamic drag. This may be done intentionally during a flight to decrease the drag on an airplane and, prevent windmilling of the propeller. As this function is often used in emergency conditions in flight, regular testing of propeller feather functions is performed. Such testing is used to exercise the feathering mechanisms of the propeller, in order to ensure that there are no dormant failures present within the feather activation system. This activation system may include any one of electronic, electrical, mechanical, and hydraulic features used to successfully feather the propeller.

The feather test is conducted manually by a pilot, at engine start and taxi-out of the aircraft. A push-button test switch is activated from the cockpit to command feathering of the propeller system. A successful feather test results in an audible drop in propeller speed which is detectable by the pilot. The feather test switch is then released to cancel the feather test operation.

There is a need to improve propeller feather testing functions.

SUMMARY

There is described herein the automation of propeller feather testing functions, whereby the test is automatically performed and a pass/fail signal is issued upon completion. The automated propeller feather test may be a system dormancy test and it may be performed while the aircraft is on the ground, during engine startup, shutdown, or other phases of engine operation.

In accordance with a first broad aspect, there is provided a method for testing a propeller feathering function. The method comprises monitoring a rotational speed over time of propeller blades of an aircraft, commanding an angle change of the propeller blades, comparing a post-angle change rotational speed of the propeller blades to an expected rotational speed without the commanded angle change and obtaining, by the processor, a rotational speed difference, and issuing a test passed signal when the rotational speed difference exceeds a threshold and a test failed signal when the rotational speed difference does not exceed the threshold.

In accordance with another broad aspect, there is provided a system for testing a propeller feathering function, the system comprising: a memory; a processor coupled to the memory; and an application stored in the memory. The application comprises program code executable by the processor for monitoring a rotational speed over time of propeller blades of an aircraft, commanding an angle change of the propeller blades, comparing a post-angle change rotational speed of the propeller blades to an expected rotational speed without the commanded angle change and obtaining, by the processor, a rotational speed difference, and issuing a test passed signal when the rotational speed difference exceeds a threshold and a test failed signal when the rotational speed difference does not exceed the threshold.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
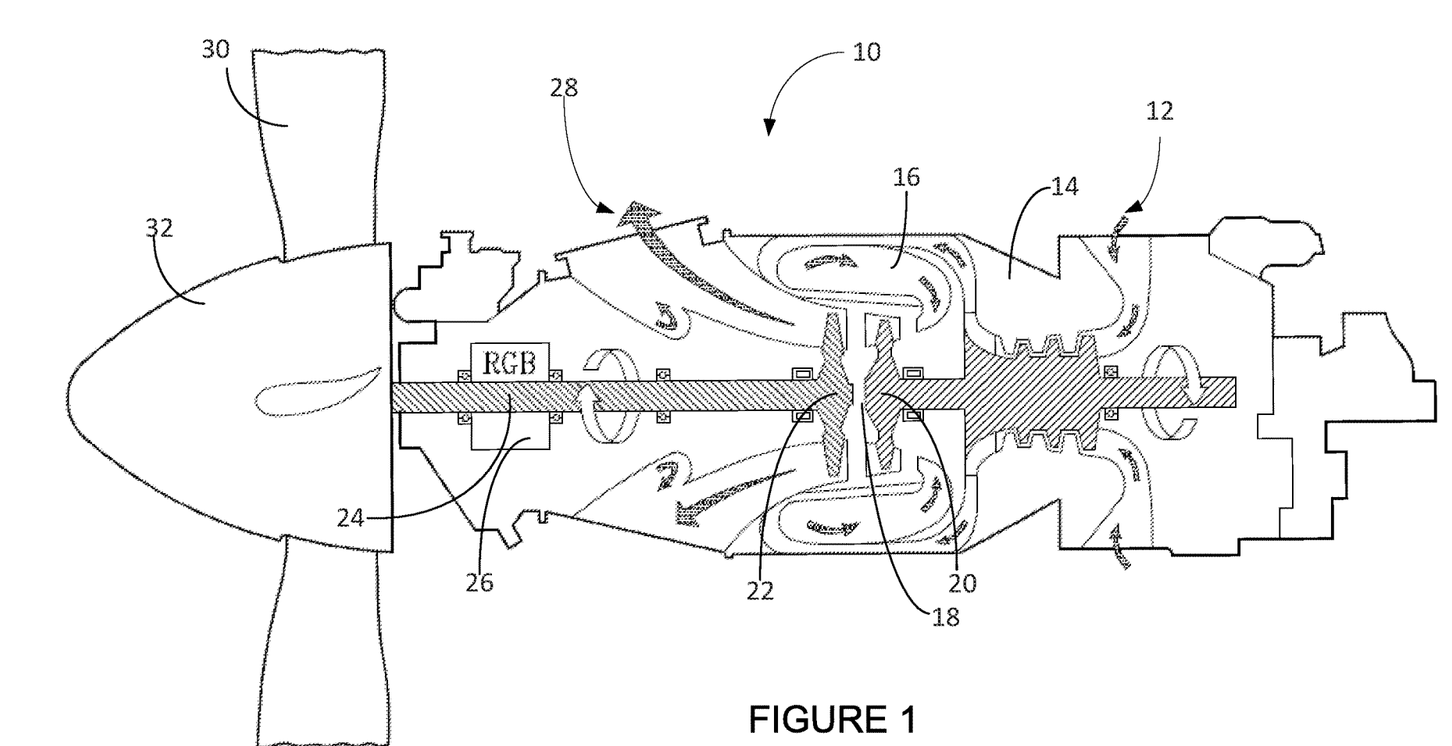
FIG. 1 is a schematic side cross-sectional view of an exemplary gas turbine engine.

FIG. 1 illustrates an exemplary engine 10, namely a gas turbine engine, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and drives the rotor shaft 24 through the reduction gearbox 26. Hot gases may then be evacuated through exhaust stubs 28. A rotor 30, in the form of a propeller through which ambient air is propelled, is hosted in a propeller hub 32. Rotor 30 may, for example, comprise a propeller of a fixed-wing aircraft or a main (or tail) rotor.

Figure 2:
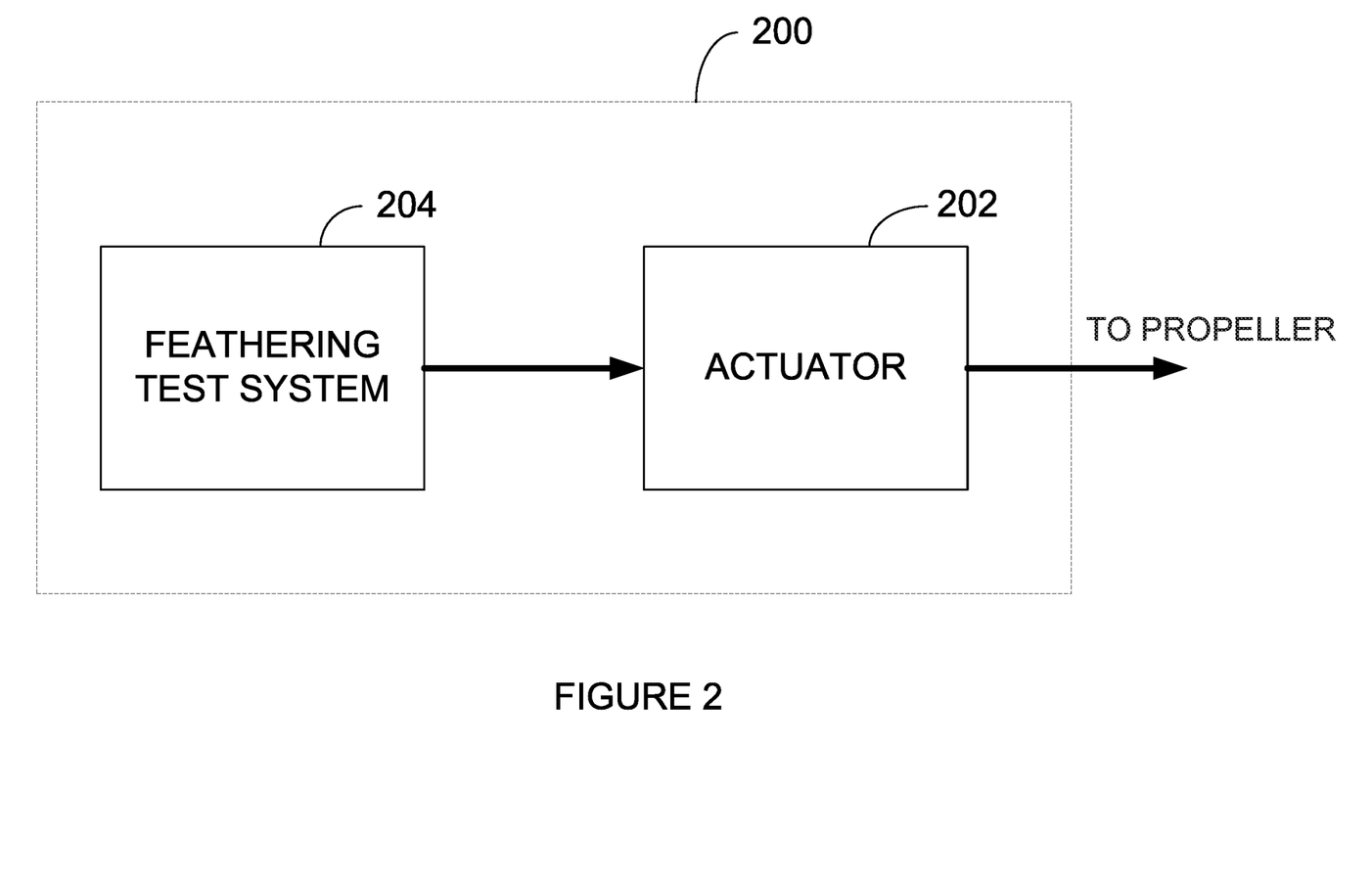
FIG. 2 is a block diagram of an exemplary aircraft propeller control system.

The aircraft engine 10 may be used in combination with an aircraft propeller control system 200, comprising an actuator 202 for modifying blade pitch for propeller feathering, and a feathering test system 204, as illustrated in FIG. 2. The propeller 30 converts rotary motion from the engine 10 to provide propulsive force to the aircraft. The pitch of the propeller 30 is variable and may be modified by the actuator 202. The actuator 202 may take different forms, depending on the type of engine and/or aircraft. In some embodiments, there may also be gearing, such as that found on turboprop aircraft. The actuator 202 may rotate the blades of the propeller 30 parallel to airflow in order to reduce drag in case of an engine failure. Such rotation may take the form of an increase (towards feathered position) or a decrease (away from feathered position) in blade pitch. The effect of an increase in blade pitch is to increase the gliding distance of the aircraft and in some cases, to maintain altitude with reduced engine power. The effect of a decrease in blade pitch is to help slow down an aircraft after landing in order to save wear on the brakes and tires.

Figure 3:
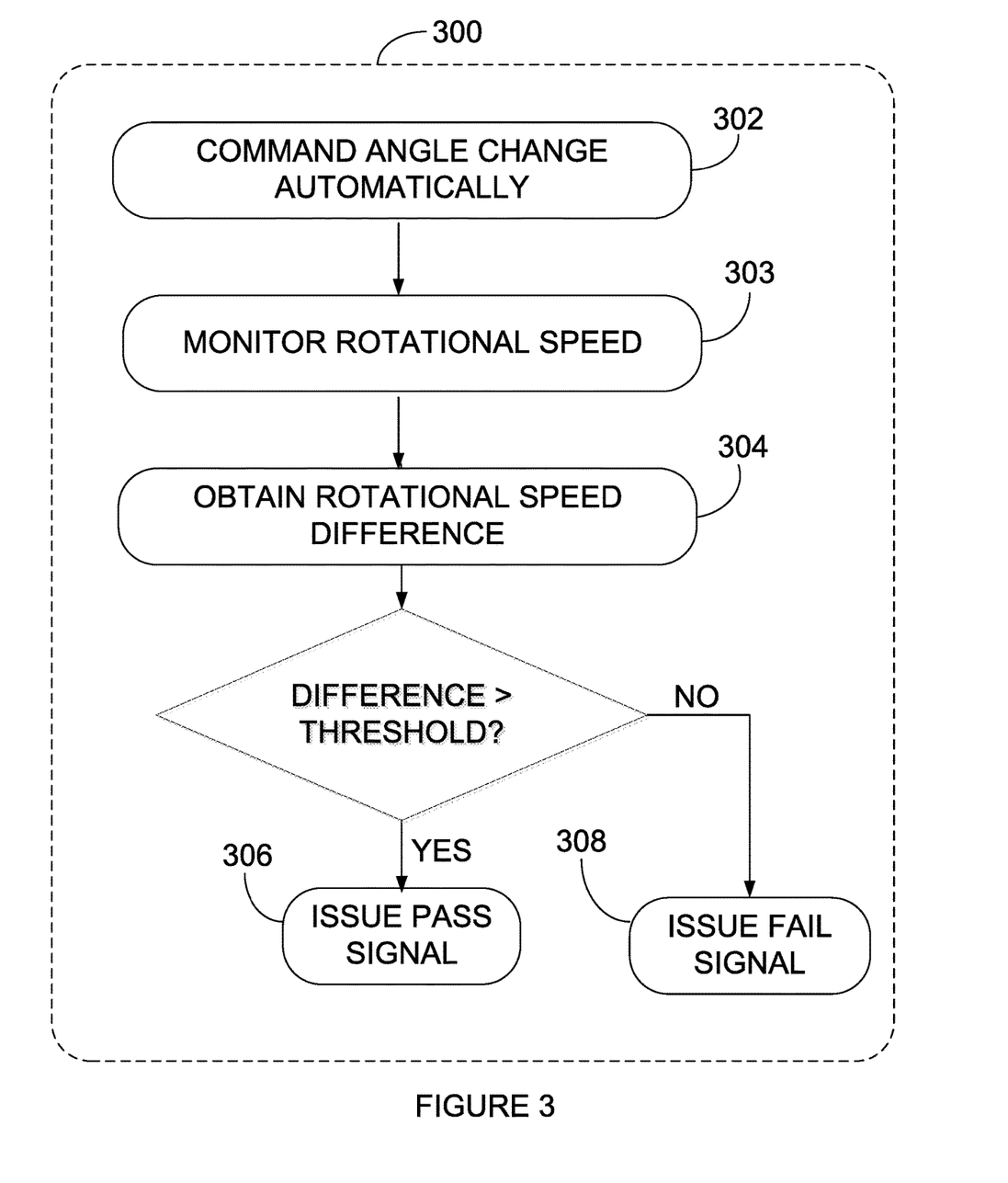
FIG. 3 is a flowchart of an exemplary method for testing a propeller feathering function.

The feathering test system 204 is coupled to the actuator 202 and configured to perform automatic testing of a propeller feathering function of an aircraft, as illustrated in the exemplary method 300 of FIG. 3. As per step 302, an angle change of the propeller blades is commanded automatically. The commanded angle change may be performed at any time prior to take-off and/or after landing, i.e. at any moment while the aircraft is on the ground. A trigger signal may be used to initiate the commanded angle change. For example, the feathering test may be associated with another task or procedure performed within the aircraft, such as engine shutdown, engine startup, or another procedure or test regularly performed by the aircraft in preparation for takeoff or after landing. Initiation of the associated task or procedure may generate the trigger signal and cause the automatic change in pitch angle for the propeller blades. The trigger signal may vary as a function of the aircraft model, the engine type, the operating environment, and internal policies/regulations of a given airline.

In some embodiments, step 302 may be preceded by detecting an aircraft-on-ground condition. Detection of an aircraft-on-ground condition may be done using various techniques, such as a weight-on-wheels signal, a ground sensor, an airspeed sensor and a global positioning system. Other techniques may also be used. In such circumstances, step 302 may be performed conditionally upon detection of the aircraft-on-ground condition.

As per step 303, the rotational speed of the propeller blades is monitored in order to detect a change subsequent to the commanded angle change compared to an expected rotational speed. In particular, a post-angle change rotational speed of the propeller blades is compared to the expected rotational speed of the propeller blades had the angle change not occurred, and a rotational speed difference is obtained, as per step 304. The rotational speed difference may be compared to a threshold. A rotational speed difference that meets the threshold is indicative that the feathering function is operational. If the rotational speed difference exceeds (or meets) the threshold, a test pass signal is issued, as per step 306. If the rotational speed difference does not exceed (or does not meet) the threshold, a test failed signal is issued, as per step 308.

Monitoring of the rotational speed may be performed using various sensors, already present on the aircraft and used for other purposes, or dedicated to the automated feathering test. In some embodiments, the method comprises returning the blade pitch to a zero pitch angle after the given time period.

In some embodiments, the blade pitch is moved from an initial zero pitch angle to a target pitch angle that is greater than a zero pitch angle and up to a maximum pitch angle (90°), such as but not limited to 5°, 30°, 45°, and 70°. This is referred to as an increase in blade pitch as the blades are moved towards the feathering position. In some embodiments, the blade pitch is moved from an initial zero pitch angle to a target pitch angle that is less than a zero pitch angle and up to a minimum pitch angle (−90°), such as but not limited to −5°, −30°, −45°, and −70°. This is referred to as a decrease in blade pitch as the blades are moved away from the feathering position. In some embodiments, the blade pitch may be increased or decreased from a position other than a zero pitch angle, and the rotational speed post-angle change is compared to the expected rotational speed for the blades at the pre-angle change position.

In some embodiments, the blade pitch is set to the target pitch angle with a single command. A timer may be used to set an end time for the test. In other words, if a rotational speed difference greater than or equal to the threshold is not detected after a given time period, the test is considered to have failed. The timer may be set for a given number of seconds, minutes, or any other unit of time as appropriate.

Alternatively, the blade pitch may be progressively changed until the target blade pitch is reached. The target blade pitch for the test may vary as a function of the aircraft model, the engine type, the operating environment, and internal policies/regulations of a given airline. The target blade pitch may be fixed or may be programmable. Progressive change of the blade pitch may be used in combination with the timer. In other embodiments, the blade pitch may be progressively changed until it reaches maximum/minimum pitch or until the rotational speed difference meets the threshold, whichever occurs first. The threshold may be set as desired, such as a 5% change, a 10% change, a 25% change, or any other appropriate amount.

Figure 4:
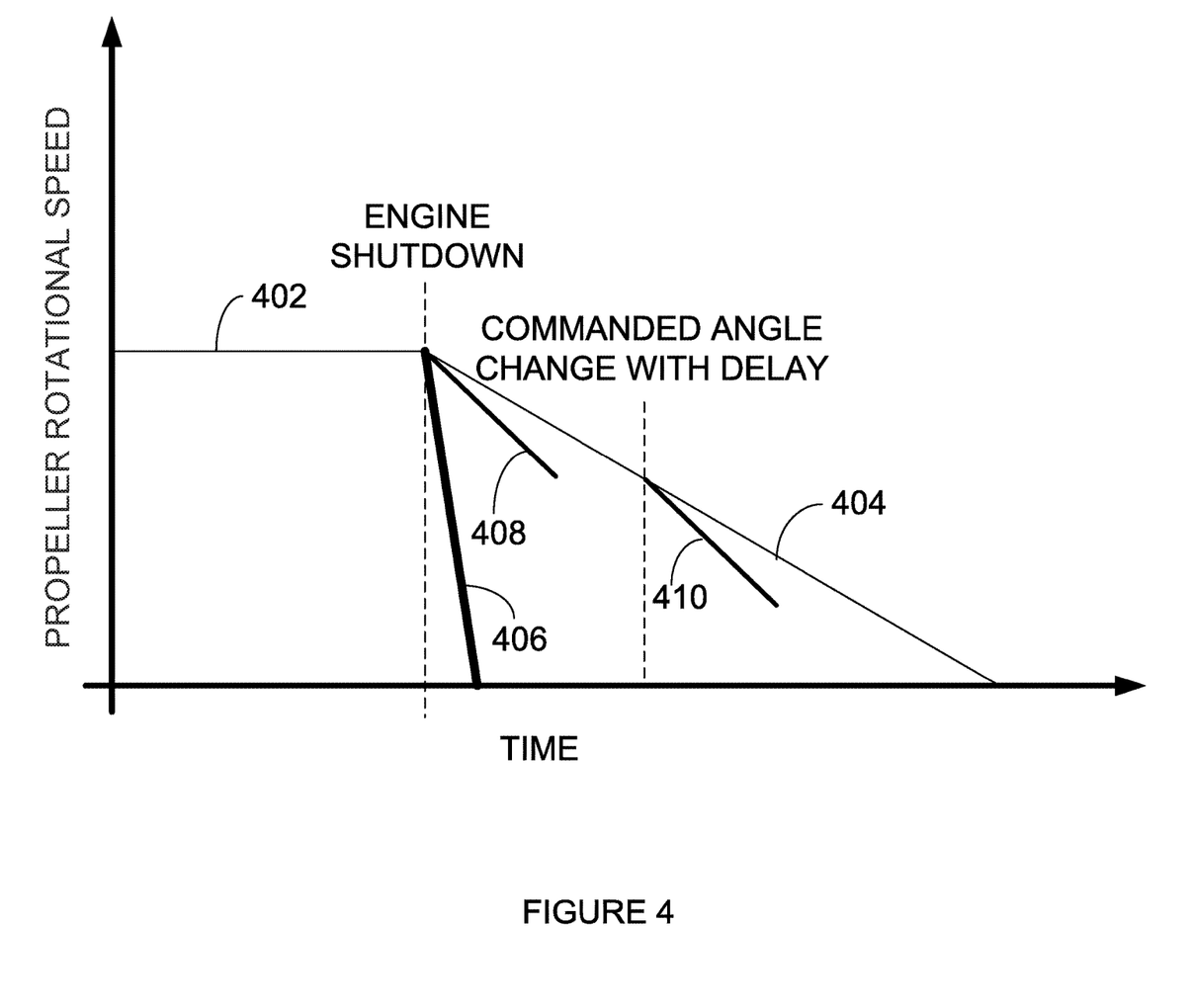
FIG. 4 is a graph of propeller rotational speed versus time for various embodiments of testing the propeller feathering function.

An exemplary embodiment of performing the feathering test at engine shutdown is illustrated in FIG. 4. Curve 402 represents the propeller rotational speed over time at zero pitch angle before engine shutdown. Curve 404 represents the expected propeller rotational speed over time at zero pitch angle after engine shutdown. A natural decay rate for the speed occurs due to the removal of rotary motion from the engine. Curve 406 represents the post-angle change rotational speed over time at maximum pitch angle, i.e. when the blade pitch has been set to 90°, after engine shutdown. Compared to curve 404, the decay rate for curve 406 is shown to be significantly greater, as the increased rotational drag of the propeller caused by the change in blade pitch results in a faster decrease in rotational speed of the propeller. Curve 408 represents the post-angle change rotational speed over time at a pitch angle that is greater than 0° and smaller than 90°, after engine shutdown. As illustrated, a slight change in pitch angle may be sufficient to detect a rotational speed difference that meets a threshold in order to confirm that the propeller feathering function is operational.

In some embodiments, monitoring the rotational speed over time comprises monitoring a rate of change of the rotational speed over time. In addition, comparing a post-angle change rotational speed of the propeller blades to an expected rotational speed comprises comparing the rate of change of the rotational speed of the propeller blades to an expected rate of change of a zero pitch angle propeller. If performed at engine shutdown, this may comprise comparing the decay rate of the rotational speed of the propeller blades at the target blade pitch to an expected natural decay rate of a zero pitch angle propeller, as per curve 404. Coordinating the feathering test with engine shutdown allows a common baseline to be used for same aircraft, as the natural decay rate may be consistent between the aircraft. Alternatively, the commanded angle change may be triggered with delay from engine shutdown. This allows the decay rate of the rotational speed (or the rotational speed itself) before and after the commanded angle change to be compared, for detection of a change indicative of a successful feathering test. This embodiment is illustrated in FIG. 4 with curve 410.

In some embodiments, the feathering test system 204 comprises a combination of hardware and software logic for performing the automatic testing. The feathering test system 204 may be a stand-alone unit or it may be incorporated into existing aircraft systems architecture. For example, the feathering test system 204 may be part of an engine control system, such as an electronic engine control (EEC) or a full authority digital engine control (FADEC). It may also be part of an integrated electronic engine and propeller control system. In some embodiments, the feathering test system 204 comprises a microcontroller and memory. The memory may be SRAM, EEPROM, or Flash and the system 204 may be analog and/or digital based. Sensor values may be read by the microcontroller and data may be interpreted using one or more lookup table. In some embodiments, the feathering test system 204 is programmable and comprises a microprocessor which can process the inputs from engine sensors in real-time. Hardware may comprise electronic components on a printed circuit board (PCB), ceramic substrate, or thin laminate substrate, with a microcontroller chip as a main component. Software code may be stored in the microcontroller or other chips, and may be updated by uploading new code or replacing the chips.

Figure 5:
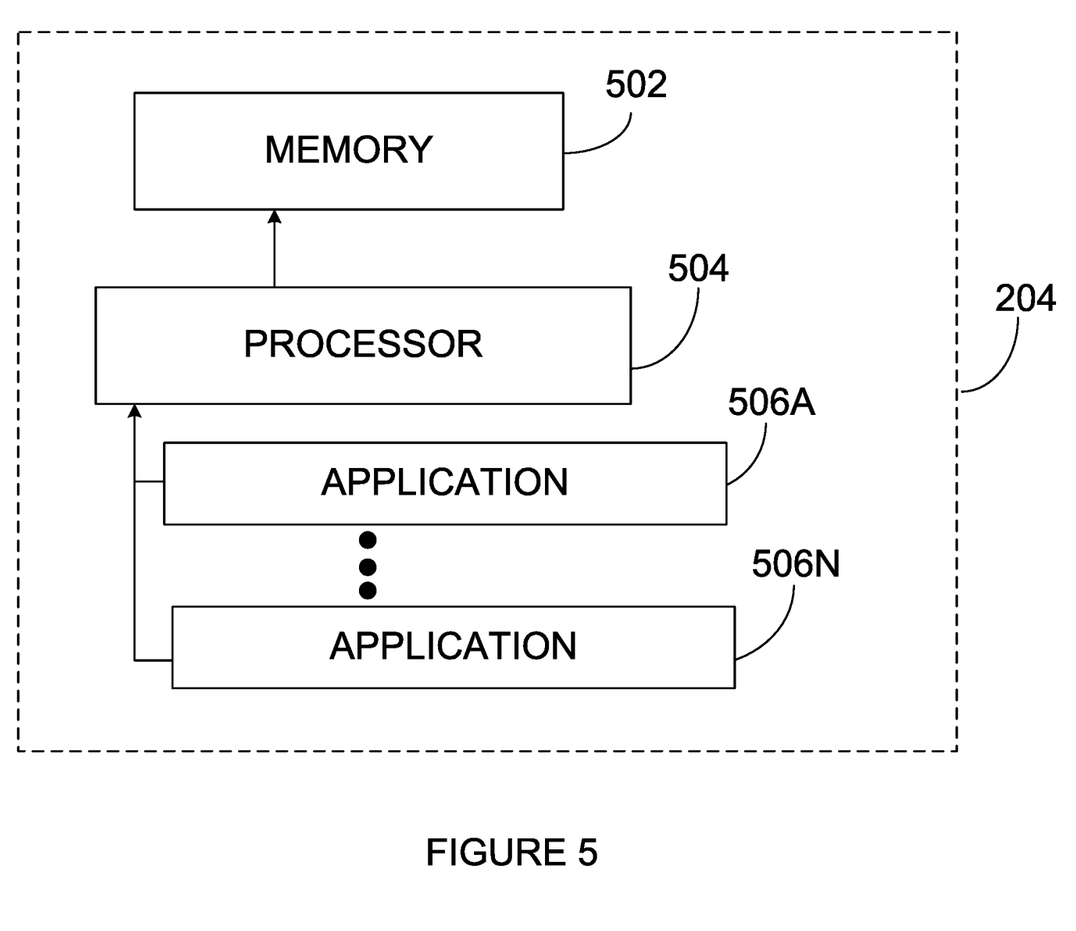
FIG. 5 is a block diagram of an exemplary embodiment for the feathering test system.

FIG. 5 illustrates another exemplary embodiment for the feathering test system 204. The feathering test system 204 may comprise, amongst other things, a plurality of applications 506a . . . 506n running on a processor 504 coupled to a memory 502. It should be understood that while the applications 506a . . . 506n presented herein are illustrated and described as separate entities, they may be combined or separated in a variety of ways. The memory 502 accessible by the processor 504 may receive and store data. The memory 502 may be a main memory, such as a high speed Random Access Memory (RAM), or an auxiliary storage unit, such as a hard disk, a floppy disk, or a magnetic tape drive. The memory 502 may be any other type of memory, such as a Read-Only Memory (ROM), or optical storage media such as a videodisc and a compact disc. The processor 504 may access the memory 502 to retrieve data. The processor 504 may be any device that can perform operations on data. Examples are a central processing unit (CPU), a front-end processor, a microprocessor, and a network processor. The applications 506a . . . 506n are coupled to the processor 304 and configured to perform various tasks.

Figure 6:
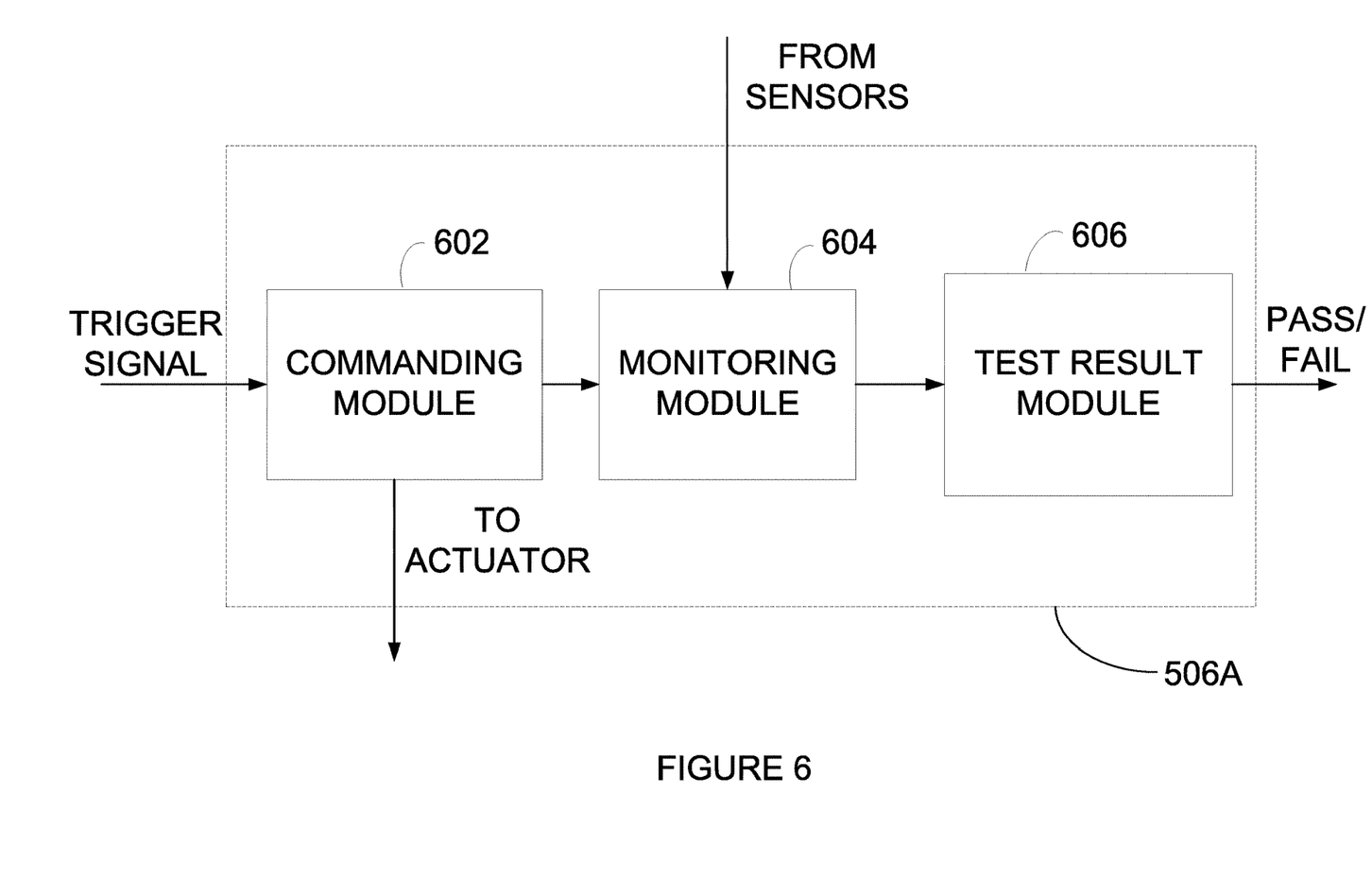
FIG. 6 is a block diagram of an exemplary embodiment of an application running on the processor of the feathering test system.

FIG. 6 is an exemplary embodiment of an application 506a running on the processor 504. The application 506a illustratively comprises a commanding module 602, a monitoring module 604, and a test result module 606. The commanding module 602 is configured for receiving the trigger signal and automatically commanding the angle change of the propeller blades, via the actuator 202. Once the blade pitch has been modified by the commanding module, the monitoring module 604 may be advised by the commanding module 602. Alternatively, the monitoring module 604 may be configured to continuously monitor rotational speed of the propeller blades, or it may itself receive the trigger signal and begin monitoring before the commanding module 602 is instructed to command the angle change. The monitoring module 604 receives from various sensors input data for comparing a post-angle change rotational speed of the propeller blades to an expected rotational speed without the commanded angle change and obtaining a rotational speed difference. The monitoring module 604 is connected to the test result module 606 for transmitting the rotational speed difference thereto. If the rotational speed difference meets the threshold, the test result module 606 will issue a pass signal. If the rotational speed difference does not meet the threshold, the test result module 606 will issue a fail signal.

In some embodiments, the test result module 606 is also configured to issue a maintenance required signal in case of a failed feathering test. The maintenance required signal may be generic and applicable to any failed feathering test. Alternatively, different maintenance required signals may be provided as a function of the specifics of the feathering test. For example, the monitoring module 604 may be configured to determine if the problem is related to the electronics, the actuator, oil, or the propeller blades themselves. This information may be passed on to the test result module 606 and the appropriate maintenance required signal may be issued accordingly. The pass/fail signal may result in a visual indicator for the pilot and/or the ground crew, such as a red light for a failed test and a green light for a passed test. A maintenance required signal may be part of the same visual indicator as a failed test or may result in a separate visual indicator for the pilot and/or ground crew.

Other variants to the configurations of the commanding module 602, the monitoring module 604, and the test result module 606 may also be provided and the example illustrated is simply for illustrative purposes.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A computer-implemented method for testing a propeller feathering function, the method comprising:
   monitoring, by a processor of a computing device, a rotational speed over time of propeller blades of an aircraft;
   commanding, by the processor of the computing device, an angle change of the propeller blades following receipt of a trigger signal associated with an engine state;
   comparing, by the processor of the computing device, a post-angle change rotational speed of the propeller blades to an expected rotational speed without the commanded angle change and obtaining, by the processor, a rotational speed difference; and issuing, by the processor of the computing device, a test passed signal when the rotational speed difference exceeds a threshold and a test failed signal when the rotational speed difference does not exceed the threshold.

2. The method of claim 1, wherein the engine state is an initiation of an engine shutdown.

3. The method of claim 1, wherein monitoring the rotational speed over time comprises monitoring a rate of change of the rotational speed over time.

4. The method of claim 3, wherein comparing a post-angle change rotational speed of the propeller blades to an expected rotational speed comprises comparing the rate of change of the rotational speed of the propeller blades to an expected rate of change of a zero pitch angle propeller.

5. The method of claim 1, further comprising detecting an aircraft-on-ground condition, and wherein commanding an angle change of the propeller blades comprises commanding the angle change only when the aircraft-on-ground condition is detected.

6. The method of claim 1, further comprising returning the propeller blades to a zero pitch angle after issuing the test passed signal.

7. The method of claim 1, wherein commanding an angle change of the propeller blades comprises commanding an angle change to a target blade pitch that is less than a maximum blade pitch.

8. The method of claim 1, wherein commanding an angle change of the propeller blades comprises progressively changing a pitch of the propeller blades until a target blade pitch is reached.

9. The method of claim 8, wherein comparing a post-angle change rotational speed of the propeller blades to an expected rotational speed comprises comparing until a first one of reaching the target blade pitch and obtaining the rotational speed difference that exceeds the threshold occurs.

10. The method of claim 1, wherein commanding an angle change of the propeller blades comprises increasing a blade pitch, and wherein comparing the post-angle change rotational speed to the expected rotational speed comprises detecting a decrease in post-angle change rotational speed compared to the expected rotational speed.

11. The method of claim 1, wherein commanding an angle change of the propeller blades comprises decreasing a blade pitch, and wherein comparing the post-angle change rotational speed to the expected rotational speed comprises detecting an increase in post-angle change rotational speed compared to the expected rotational speed.

12. The method of claim 1, wherein the engine state is an initiation of an engine start-up.

13. A system for testing a propeller feathering function, the system comprising:

a memory;

a processor coupled to the memory; and an application stored in the memory and comprising program code executable by the processor for:

monitoring a rotational speed over time of propeller blades of an aircraft;

commanding an angle change of the propeller blades following receipt of a trigger signal associated with an engine state;

comparing a post-angle change rotational speed of the propeller blades to an expected rotational speed without the commanded angle change and obtaining, by the processor, a rotational speed difference; and issuing a test passed signal when the rotational speed difference exceeds a threshold and a test failed signal when the rotational speed difference does not exceed the threshold.

14. The system of claim 13, wherein the engine state is an initiation of an engine shutdown.

15. The system of claim 13, wherein monitoring the rotational speed overtime comprises monitoring a rate of change of the rotational speed over time.

16. The system of claim 15, wherein comparing a post-angle change rotational speed of the propeller blades to an expected rotational speed comprises comparing the rate of change of the rotational speed of the propeller blades to an expected rate of change of a zero pitch angle propeller.

17. The system of claim 13, wherein the program code is further executable for detecting an aircraft-on-ground condition, and wherein commanding an angle change of the propeller blades comprises commanding the angle change only when the aircraft-on-ground condition is detected.

18. The system of claim 13, wherein the program code is further executable for returning the propeller blades to a zero pitch angle after issuing the test passed signal.

19. The system of claim 13, wherein commanding an angle change of the propeller blades comprises commanding an angle change to a target blade pitch that is less than a maximum blade pitch.

20. The system of claim 13, wherein commanding an angle change of the propeller blades comprises progressively changing a pitch of the propeller blades until a target blade pitch is reached.

21. The system of claim 20, wherein comparing a post-angle change rotational speed of the propeller blades to an expected rotational speed comprises comparing until a first one of reaching the target blade pitch and obtaining the rotational speed difference that exceeds the threshold occurs.

22. The system of claim 13, wherein commanding an angle change of the propeller blades comprises increasing a blade pitch, and wherein comparing the post-angle change rotational speed to the expected rotational speed comprises detecting a decrease in post-angle change rotational speed compared to the expected rotational speed.

23. The system of claim 13, wherein commanding an angle change of the propeller blades comprises decreasing a blade pitch, and wherein comparing the post-angle change rotational speed to the expected rotational speed comprises detecting an increase in post-angle change rotational speed compared to the expected rotational speed.

24. The system of claim 13, wherein the engine state is an initiation of an engine start-up.

\* \* \* \* \*